United States Patent
Knobloch

(10) Patent No.: US 10,015,924 B2
(45) Date of Patent: Jul. 10, 2018

(54) AGRICULTURAL IMPLEMENT

(71) Applicant: CNH Industrial America LLC, New Holland, PA (US)

(72) Inventor: Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/278,173

(22) Filed: Sep. 28, 2016

(65) Prior Publication Data

US 2018/0084707 A1    Mar. 29, 2018

(51) Int. Cl.
| | |
|---|---|
| A01B 21/08 | (2006.01) |
| A01B 63/14 | (2006.01) |
| A01B 51/04 | (2006.01) |

(52) U.S. Cl.
CPC ............ *A01B 63/14* (2013.01); *A01B 21/086* (2013.01); *A01B 51/04* (2013.01)

(58) Field of Classification Search
CPC ..... A01B 21/08; A01B 21/083; A01B 21/086; A01B 5/00; A01B 5/04; A01B 5/06; A01B 73/00–73/67
USPC .................................................. 172/568, 578
See application file for complete search history.

(56) References Cited

U.S. PATENT DOCUMENTS

| | | | |
|---|---|---|---|
| 2,694,279 A | 11/1954 | Nelson et al. | |
| 2,795,911 A | 6/1957 | Rasmussen et al. | |
| 3,297,097 A | 1/1967 | Pryor | |
| 3,759,332 A | 9/1973 | Robertson, Sr. | |
| 3,831,685 A * | 8/1974 | Birkenbach | A01B 15/16 172/311 |
| 3,901,327 A * | 8/1975 | Mitchell | A01B 21/08 172/248 |
| 3,918,529 A * | 11/1975 | Frager | A01B 23/046 172/294 |
| 4,176,721 A | 12/1979 | Poggemiller et al. | |
| 4,687,065 A | 8/1987 | Cope et al. | |
| 5,555,825 A | 9/1996 | Geddes | |
| 8,118,110 B2 | 2/2012 | Tamm et al. | |
| 8,122,970 B2 * | 2/2012 | Palen | A01B 73/046 172/311 |
| 8,302,700 B2 | 11/2012 | Kovach et al. | |

(Continued)

FOREIGN PATENT DOCUMENTS

| | | | | |
|---|---|---|---|---|
| CA | 1096685 A * | 3/1981 | ............ | A01B 21/08 |
| EP | 1391145 A1 * | 2/2004 | ............ | A01B 21/08 |

OTHER PUBLICATIONS

"2012 Case IH 370 with Gauge Wheels" taken from http://www.tractorhouse.com/listingsdetail/printdetail.aspx, Apr. 10, 2013 (2 pages).

(Continued)

*Primary Examiner* — Matthew D. Troutman
(74) *Attorney, Agent, or Firm* — Rebecca L. Henkel; Rickard K. DeMille

(57) ABSTRACT

A disk harrow having a carriage frame and diverging forward and rear secondary frames extending laterally with respect to a travel direction. Gangs of disk blades are connected to and supported by the secondary frames. A portion of the outermost portion of the forward secondary frame is articulated relative to the remainder of the frames and has a ground support wheel allowing its height to be independently controlled relative to the remainder of the secondary frames.

5 Claims, 2 Drawing Sheets

(56) References Cited

U.S. PATENT DOCUMENTS

| | | | |
|---|---|---|---|
| 2008/0110649 A1 | 5/2008 | Connell et al. | |
| 2010/0084149 A1* | 4/2010 | Kovach | A01B 21/08 |
| | | | 172/396 |
| 2010/0314144 A1* | 12/2010 | Hennes | A01B 21/083 |
| | | | 172/178 |
| 2011/0284253 A1 | 11/2011 | Stevenson | |
| 2013/0327550 A1* | 12/2013 | Hake | A01B 21/08 |
| | | | 172/580 |
| 2015/0181797 A1* | 7/2015 | Abbott | A01B 73/046 |
| | | | 172/568 |
| 2016/0205862 A1* | 7/2016 | Sudbrink | A01B 63/22 |
| 2017/0079197 A1* | 3/2017 | Steinlage | A01B 73/044 |

OTHER PUBLICATIONS

"Sunflower 1000 Series Disc Harrows", AGCO Corporation, 2011 (13 pages).

* cited by examiner

AGRICULTURAL IMPLEMENT

BACKGROUND OF THE INVENTION

1. Field of the Invention

The present invention relates to agricultural implements, and, more particularly, to tillage implements.

2. Description of the Related Art

In the continuing quest for providing greater efficiency in the operation of farm implements, machines have been constructed to have ever increasing lateral spans relative to a tractor or central unit propelling the implement over a field. When the span increases to realize greater efficiency and speed, the criteria of having a uniform and level tool contact with the soil becomes extremely critical. Equipment with significant lateral spans have many different joints and are usually articulated to enable transport to and between fields.

The lateral expansion of the agricultural implement, particularly in the case of a disk harrow presents additional problems. The accepted way to utilize a disk harrow is to have disk blades oriented at an angle with respect to a line running at right angles to the direction of movement. This is typically accomplished with forward and rear frames that are each extending at an angle relative to truly right angles to the direction. The forward frame is angled forward and the rear frame is angled rearward so that the included angle between the two is greater than 30°. As the overall lateral width of the disk harrow increases, the forward to rear distance of the outermost portion of the front and rear frames can reach distances of over twenty-two feet. The current approach to disk harrows is to support the gangs of disk blades on a rigid structural platform substantially within the same plane. The ground support wheels that establish the height of the frames above the soil and thus the penetration of the disk blades are positioned on the disk harrow in between the forward and rear sub frames to establish the overall depth of the plane of the frames above the field.

When tilling uneven terrain, the significant distance between the ends of the forward and rear frames becomes an issue in that they may have difficulty to properly follow the contour of the soil. The problem becomes even greater when the disk harrow is used to practice vertical tillage in which the penetration of the disk blades is less than that for normal tillage which requires increased ground following capabilities so that the blades continue to be engaged with the soil profile.

Accordingly, what is needed in the art is a disk harrow which more closely follows contours in the soil at the periphery of the secondary frames.

SUMMARY OF THE INVENTION

The present invention seeks to provide a disk harrow with a frame that more closely follows the contour of the soil with minimum added complication and expense.

In one form, the invention is an agricultural tillage implement including a carriage frame assembly including a pull hitch extending in a travel direction. Forward and rear secondary frames extend generally laterally with respect to the travel direction. Gangs of disk blades are connected to and supported by the secondary frames to till soil over which the tillage implement traverses. The forward and rear secondary frames extend from the carriage frame at forward and rear angles causing them to diverge from one another toward the lateral extremities of the tillage implement. The secondary frames are mounted to lie in a common plane at a selected distance from the soil. At least a portion of the outer most portion of the forward secondary frame is articulated relative to the remainder of the forward secondary frame to be independently positioned at a selected distance from the soil.

An advantage of the present invention is a simplified and robust way to attain flexibility in the frames of a tillage implement.

Another advantage is that frame flexibility is attained with a minimal addition of additional components.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention and such exemplifications is not to be construed as limiting the scope of the invention in any manner.

DETAILED DESCRIPTION OF THE INVENTION

Figure 1:
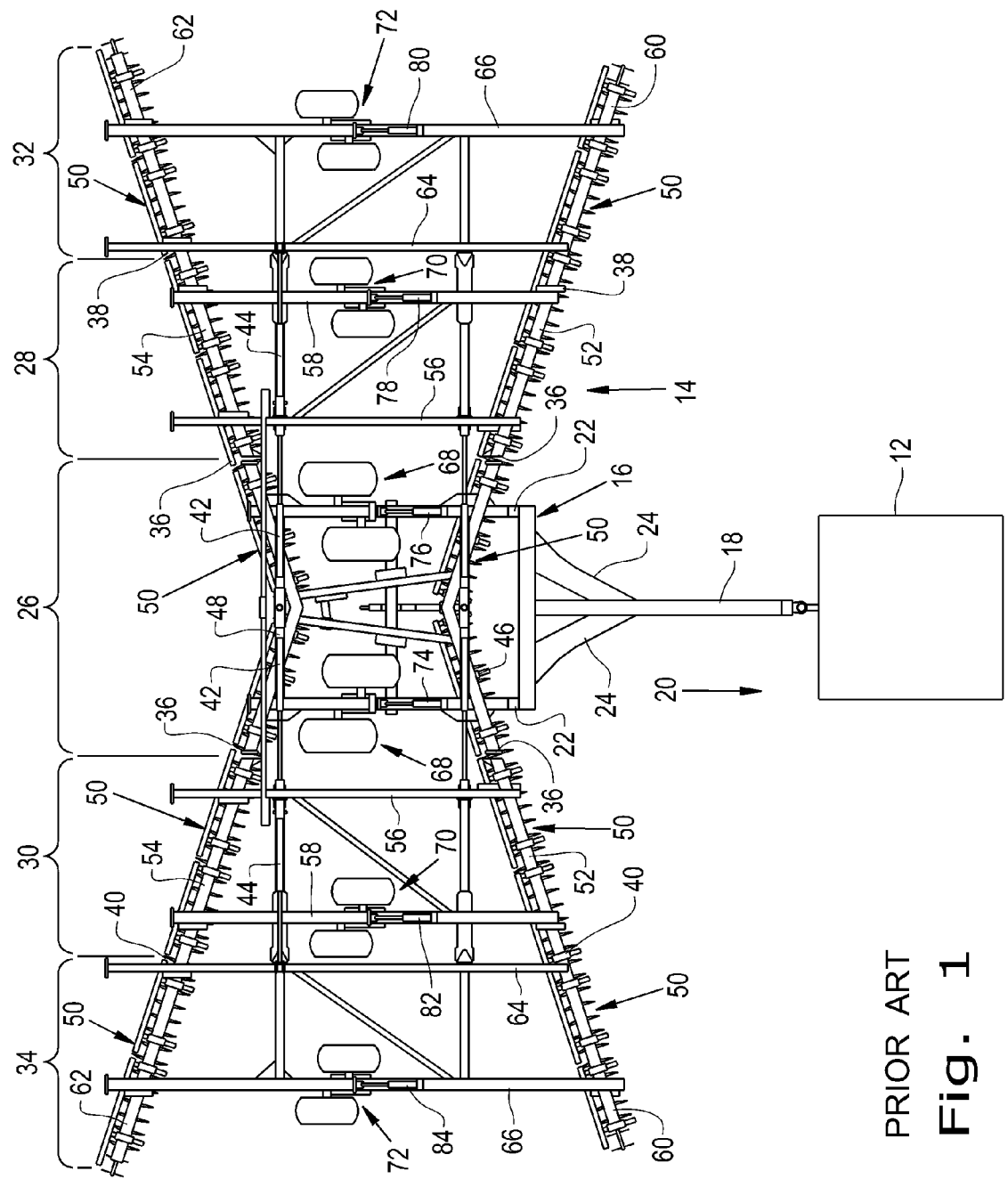
FIG. 1 illustrates a plan view of a prior art tillage implement including a support of disk blades being pulled by a tractor, shown in schematic fashion; and, FIG. 2 illustrates a fragmentary partial view of a tillage implement embodying the present invention.

Referring now to the drawings, and more particularly to FIG. 1, there is shown a prior art tillage apparatus which generally includes a tractor 12, shown schematically, and an agricultural tillage implement 14 for tilling the soil prior to seeding. It should be noted that many different tools may be employed with the tillage implement 14 beyond the embodiment shown.

Agricultural tillage implement 14 is configured as a multi-section field disk cultivator 14, and includes a carriage frame assembly 16. Carriage frame assembly 16 is the section that is directly towed by a traction unit, such as agricultural tractor 12. Carriage frame assembly 16 includes a pull hitch 18 generally extending in a travel direction 20, and forward and aft oriented carrier frame members 22 which are coupled with and extend from pull hitch 18. Reinforcing gusset plates 24 may be used to strengthen the connection between pull hitch 18 and carrier frame members 22.

The tillage implement 14 has a center section 26, an inner right wing section 28 and an outer right wing section 32 as viewed in FIG. 1. A left inner wing section 30 connects with a left outer wing section 34. The center section 26 is pivotally connected to the inner wings 28 and 30 by pivotal interconnections at 36. The right inner wing section 28 and right outer wing section 32 are pivotally interconnected at 38. The left inner wing section 30 and outer left wing section 34 are interconnected at pivotal joints 40. The details of the pivotal joints are omitted to enable a clearer understanding of the present invention. However, it should be understood that the pivotal connections allow articulation of the various sections between a field position in which each of the sections are substantially in a common plane and a transport position in which the outer wing sections 32 and 34 are folded, as well as the inner wing sections 28 and 30, to enable sufficient road clearance.

Actuator assemblies 42 are connected between the center section 26 and inner wing sections 28 and 30 to enable pivoting between the field and transport position. Actuator assemblies 44 are interconnected between right inner wing section 28 and outer right wing section 32 as well as inner left wing section 30 and outer wing section 34 to enable the pivoting movement.

The center section 26 has a forward frame member 46 extending across carrier frames 22 and secured thereto. Center section 26 additionally has an aft frame member 48 structurally interconnected with carrier frames 22 at their aft end. As is noted above, the frame elements 46 and 48 extend generally laterally with respect to the direction of movement 51 of the agricultural implement. Frame members 46 and 48, however, extend at an approximately 18 degree angle as is known in the tillage art to produce appropriate working of the soil. The frame members 46 and 48 provide support beneath them for gangs of disc blades 50. The gangs of disc blades 50 are resiliently connected to the frame elements in appropriate fashion to provide smooth working of the soil.

The inner wing sections 28 and 30 each have a forward frame member 52 and an aft frame member 54. These frame members are interconnected by forward and aft oriented inner frame members 56 and outer frame members 58. The forward and aft frame members 52 and 54 form an extension of forward and aft frame members 46 and 48. The forward and aft frame members 52 and 54 each also support gangs of disc blades 50.

The outer wing sections 32 and 34 each have forward and aft frame members 60 and 62 which each support gangs of disk blades 50. Frame members 60 and 62 are interconnected by inner frame members 64 and outer frame members 66.

The various sections 26, 28, 30, 32 and 34 of the tillage implement 14 are positioned at variable positions relative to the soil and thus set the position of the gangs of disk harrows 50 above the soil and the depth they cut into the soil. As illustrated, the variable support elements are shown as wheel sets but it should be understood that other forms of variable support may be employed. As illustrated, wheel sets 68 are pivotally interconnected with carrier frames 22 so that they provide support to the forward and aft frame members 46 and 48 relative to the soil. Wheel sets 70 are interconnected with frame element 58 to variably position inner wing sections 28 and 30 relative to the soil. In addition, wheel sets 72 are pivotally mounted on frame members 66 to position outer wing sections 32 and 34 at a variable distance relative to the soil. Actuators 74 and 76 manipulate wheel sets 68 to establish the distance of center section 26 relative to the soil. Actuator 78 and 80 establish the position of sections 28 and 32 relative to the soil. Finally, actuator assemblies 82 and 84 position sections 30 and 34 relative to the soil.

The cultivator illustrated in FIG. 1 is typical of tillage equipment in which the sections 26, 28, 32, 30 and 34, in the field position are essentially in a rigid fixed plane. As mentioned previously, distance between the front and rear frame members 60 and 62 can be quite significant as the overall lateral width of the machine is increased because the machine is rigid and there is a significant distance between the forward frames and the wheel assembly 72 setting the elevation above the ground. There occurs a difficulty in following local undulations in the soil.

Figure 2:
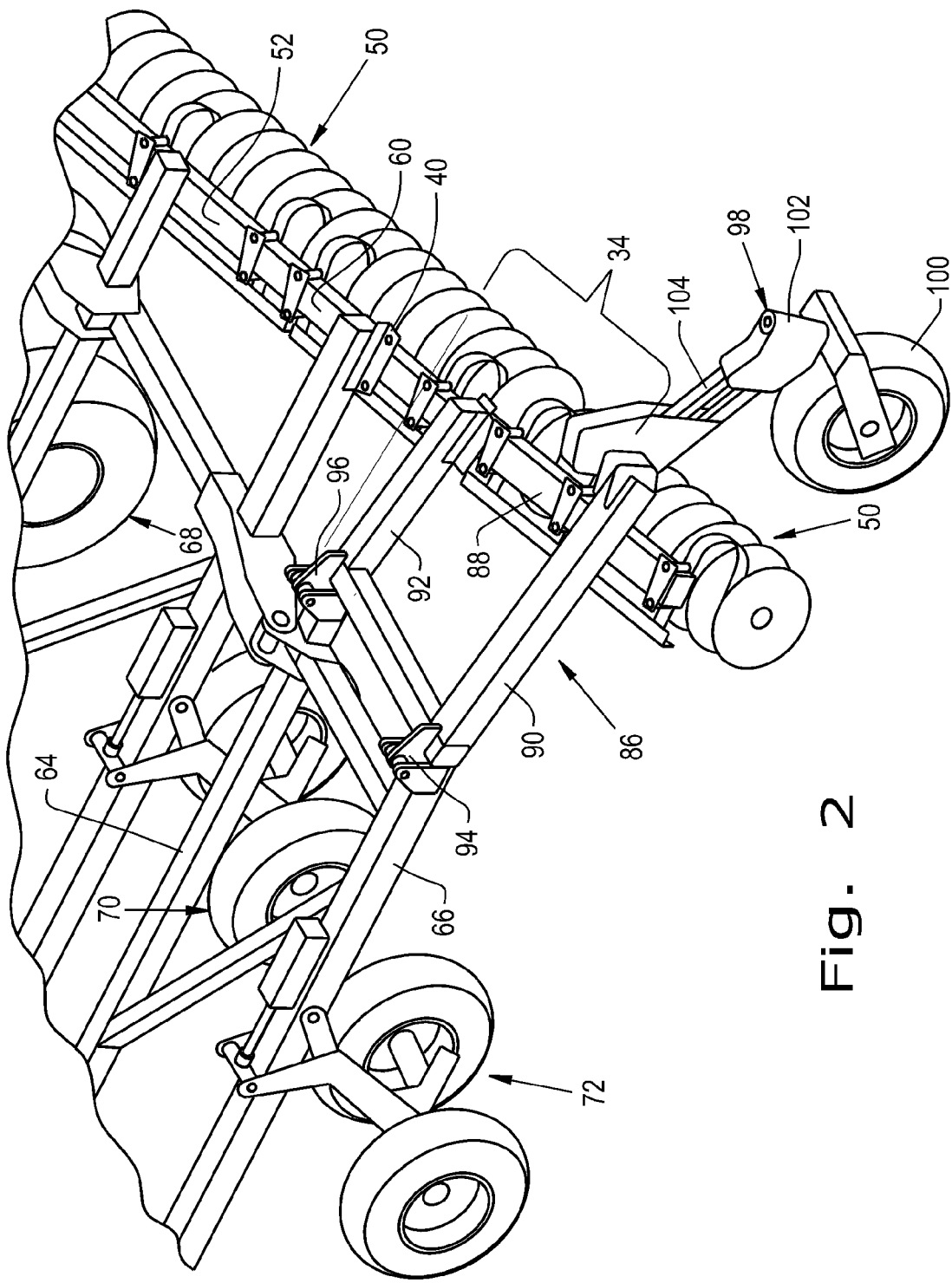

In accordance with the present invention, the cultivator structure illustrated in FIG. 2 solves this problem. FIG. 2 is an expanded fragmentary perspective view of a cultivator as in FIG. 1 with like parts and components being given like numbers. Thus, there is a forward frame member 52 supporting a gang of disk blades 50 and an outer wing section 34 interconnected to inner wing section 30 at a pivotal connection 40. Because the cultivator is symmetrical about its center line, only the right side as looking forward in the forward direction 20 will be described with the understanding that the left side is a duplicate. The outer sections 32, 34, the wheel assemblies 72 and fore and aft frame members 64 and 66 are as in FIG. 1. However, a sub frame assembly 86 is incorporated in the cultivator. The sub frame assembly 86 includes fore and aft frame members 90 and 92 pivotally connected to forward and aft frame members 66 and 64 by pivotal connections 94 and 96, respectively. Frame members 90 and 92 extend forward to a lateral frame member 88 which in turn supports a gang of disk blades 50. Thus the gang of disk blades 50 is able to follow the ground contour independently of the level set by wheel assemblies 72.

The relationship of the gang of disk blades 50 relative to the ground is set by a wheel assembly 98 having a wheel 100 connected to a castor support 102 on a forward extending frame member 104 that is secured to frame member 88. The relative position of wheel 100 relative to gangs of disk blades 50 may be adjusted either in a linear fashion or by selective pivoting of forward extending frame member 104. Thus, it is seen that the outermost forward gangs of disk blades 50 follows the contour set by wheel 100 instead of the contour set by wheel assembly 72. As a result, the disk blades 50 closely follow the contour of the soil and especially irregular features. The benefit of the arrangement of FIG. 2 is even greater when one is adopting a vertical tillage approach in which the penetration of the disks may be on the order of several inches, thus ensuring that any irregularities are easily accommodated.

Preferably, the weight of the structural elements of outboard frame assembly 86 and the weight of the gang of disk blades 50 is sufficient to provide the appropriate penetration of the soil. If necessary, the frame members may be weighted down, for example with sand or an additional weight element may be employed. In addition, spring loaded mechanisms may be provided to generate the appropriate down force if needed.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
 a carriage frame assembly including a pull hitch extending in a travel direction;
 forward and rear secondary frames extending generally laterally with respect to the travel direction;
 gangs of disks connected to and supported by the secondary frames to till soil over which the tillage implement traverses;
 the forward and rear secondary frames extending from the carriage frame assembly at forward and rear angles, causing them to diverge from one another toward lateral extremities of the agricultural tillage implement, the secondary frames mounted to lie in a common plane, at a selected distance from the soil when the agricultural tillage implement is in a working position such that the gangs of disks carried thereon are positioned at a selected depth for tillage based on the selected distance from the soil of the secondary frames; and a ground support wheel coupled to a portion of a leading edge of an outermost portion of the forward secondary frame, wherein the portion of the outermost portion of the forward secondary frame is articulated to permit the portion of the outermost portion of the forward secondary frame, when in the working position, to pivot such that the portion of the outermost portion and associated outermost gangs of disks carried thereon are selectively adjustable relative to the remainder of the forward secondary frame and independently positioned at a selected distance from the soil via selective adjustment of the ground support wheel to set the depth for tillage of the gangs of disks on at least the portion of the outermost portion;

wherein the portion of the outermost portion pivots on an axis perpendicular to the travel direction.

2. The agricultural tillage implement as claimed in claim 1, wherein the ground support wheel extends a distance forward of the outermost portion in the travel direction.

3. The agricultural tillage implement as claimed in claim 2, wherein the ground support wheel further comprises a wheel assembly further including a forward extending frame member and a castor support for the ground support wheel.

4. The agricultural tillage implement as claimed in claim 1, wherein the portion of the outermost portion is configured to receive at least one of a weight element and a spring loaded mechanism.

5. The agricultural tillage implement as claimed in claim 3, wherein the position of the portion of the outermost portion is adjustable via at least one of the forward extending frame member and the castor support.

\* \* \* \* \*